(12) United States Patent
Baek et al.

(10) Patent No.: US 11,924,843 B2
(45) Date of Patent: Mar. 5, 2024

(54) METHOD AND APPARATUS TO PERFORM AUTONOMOUS RETRANSMISSION CONSIDERING REACTIVATED CONFIGURED GRANT

(71) Applicant: Samsung Electronics Co., Ltd., Suwon-si (KR)

(72) Inventors: Sangkyu Baek, Suwon-si (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 109 days.

(21) Appl. No.: 17/217,147

(22) Filed: Mar. 30, 2021

(65) Prior Publication Data
US 2021/0307057 A1 Sep. 30, 2021

(30) Foreign Application Priority Data
Mar. 30, 2020 (KR) .................. 10-2020-0038534

(51) Int. Cl.
*H04W 72/23* (2023.01)
*H04L 1/1812* (2023.01)
(Continued)

(52) U.S. Cl.
CPC .......... *H04W 72/23* (2023.01); *H04L 1/1819* (2013.01); *H04L 1/1874* (2013.01);
(Continued)

(58) Field of Classification Search
CPC ............. H04W 72/14; H04W 72/042; H04W 72/1242; H04W 76/27; H04W 80/02;
(Continued)

(56) References Cited

U.S. PATENT DOCUMENTS

| | | | |
|---|---|---|---|
| 2020/0053820 A1* | 2/2020 | Chin | H04W 72/56 |
| 2020/0119860 A1* | 4/2020 | Shi | H04W 76/27 |
| 2021/0227576 A1* | 7/2021 | Lin | H04W 72/0446 |

FOREIGN PATENT DOCUMENTS

| | | |
|---|---|---|
| EP | 3 618 543 A1 | 3/2020 |
| WO | 2021/059089 A1 | 4/2021 |
| WO | WO-2022086683 A1 * | 4/2022 |

OTHER PUBLICATIONS

Huawei, HiSilicon, Prioritization between configured and dynamic grants, 3GPP TSG-RAN WG2 Meeting#106, Reno, United States, May 13-17, 2019, R2-1906505. (Year: 2019).*

(Continued)

*Primary Examiner* — Shailendra Kumar
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method performed by a terminal in a communication system is provided. The method includes receiving, from a base station, configuration information on a configured grant for uplink transmission, the configured grant being configured with an autonomous transmission; in case that a previous configured grant for a hybrid automatic repeat request (HARQ) process was not prioritized, a transmission of a first medium access control (MAC) protocol data unit (PDU) obtained for the HARQ process has not been performed, and a size of the first MAC PDU matches a size of a configured grant, identifying that the first MAC (Continued)

PDU has been obtained for the configured grant; and in case that the configured grant is a prioritized uplink grant, delivering the obtained first MAC PDU.

16 Claims, 16 Drawing Sheets

(51) Int. Cl.
    *H04L 1/1867*     (2023.01)
    *H04W 72/566*     (2023.01)
    *H04W 76/27*     (2018.01)
    *H04W 80/02*     (2009.01)

(52) U.S. Cl.
    CPC ......... *H04W 72/569* (2023.01); *H04W 76/27* (2018.02); *H04W 80/02* (2013.01)

(58) Field of Classification Search
    CPC ... H04L 1/1819; H04L 1/1874; H04L 1/1887; H04L 1/1822; H04L 1/1812; H04L 1/1835; H04L 5/0098

See application file for complete search history.

(56) References Cited

OTHER PUBLICATIONS

Oppo, Sony, Huawei, HiSilicon, ZTE Corporation, Sanechips, Issues on ignoring the received UL grant for deprioritized PDU, 3GPP TSG-RAN WG2 Meeting #108, Reno, US, Nov. 18-Nov. 22, 2019, R2-1915096 (Year: 2019).*
Huawei et al., 'Prioritization between configured and dynamic grants', R2-1906505, 3GPP TSG-RAN WG2 Meeting#106, Reno, United States, May 3, 2019.
Oppo et al., 'Issues on ignoring the received UL grant for deprioritized PDU', R2-1915096, 3GPP TSG RAN WG2 Meeting #108, Reno, United States, Nov. 8, 2019.
Samsung, 'Priority Value of an Uplink Grant', R2-1915342, 3GPP TSG-RAN2 Meeting #108, Reno, United States, Nov. 8, 2019.
International Search Report dated Jul. 13, 2021, issued in International Patent Application No. PCT/KR2021/003916.
Huawei et al: "Remaining issues on Configured Grant", R2-2001033, 3GPP TSG-RAN WG2 Meeting #109 electronic, Feb. 24-Mar. 6, 2020.
Institute for Information Industry (III): "Deprioritized transmissions on configured grants" R2-2000755, 3GPP TSG-RAN WG2 Meeting#109 electronic, Online, Feb. 24-Mar. 6, 2020.
Qualcomm Incorporated: "Open issues in autonomous retransmission", R2-2001291, 3GPP TSG-RAN WG2 Meeting #109 electronic, Feb. 24-Mar. 6, 2020.
European Search Report dated Dec. 16, 2022, issued in European Application No. 21778730.8.

* cited by examiner

METHOD AND APPARATUS TO PERFORM AUTONOMOUS RETRANSMISSION CONSIDERING REACTIVATED CONFIGURED GRANT

CROSS-REFERENCE TO RELATED APPLICATION(S)

This application is based on and claims priority under 35 U.S.C. § 119(a) of a Korean patent application number 10-2020-0038534, filed on Mar. 30, 2020, in the Korean Intellectual Property Office, the disclosure of which is incorporated by reference herein in its entirety.

BACKGROUND

1. Field

The disclosure relates to operations of a terminal and a base station in a mobile communication system. More particularly, the disclosure relates to a method and an apparatus for performing autonomous retransmission by considering a (re)activated configured grant in a mobile communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for performing, by a terminal, autonomous retransmission by considering reactivation or reconfiguration of a configured grant even if the characteristics of configured grant resources are changed in a mobile communication system.

Additional aspects will be set forth in part in the description which follows and, in part, will be apparent from the description, or may be learned by practice of the presented embodiments.

In accordance with an aspect of the disclosure, a method performed by a terminal in a communication system is provided. The method includes receiving, from a base station, configuration information on a configured grant for uplink transmission, the configured grant being configured with an autonomous transmission, in case that a previous configured grant for a hybrid automatic repeat request (HARQ) process was not prioritized, a transmission of a first medium access control (MAC) protocol data unit (PDU) obtained for the HARQ process has not been performed, and a size of the first MAC PDU matches a size of a configured grant, identifying that the first MAC PDU has been obtained for the configured grant, and in case that the configured grant is a prioritized uplink grant, delivering the obtained first MAC PDU.

In accordance with another aspect of the disclosure, a terminal in a communication system is provided. The terminal incudes a transceiver, and a controller coupled with the transceiver and configured to receive, from a base station, configuration information on a configured grant for uplink transmission, the configured grant being configured with an autonomous transmission, in case that a previous configured grant for a HARQ process was not prioritized, a transmission of a first MAC PDU obtained for the HARQ process has not been performed, and a size of the first MAC PDU matches a size of a configured grant, identify that the first MAC PDU has been obtained for the configured grant, and in case that the configured grant is a prioritized uplink grant, deliver the obtained first MAC PDU.

In accordance with another aspect of the disclosure, by proposing a method for performing, by a terminal, autonomous retransmission by considering reactivation or reconfiguration of a configured grant, the terminal may perform autonomous retransmission even if the characteristics of configured grant resources are changed due to the reactivation or reconfiguration thereof.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspect, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
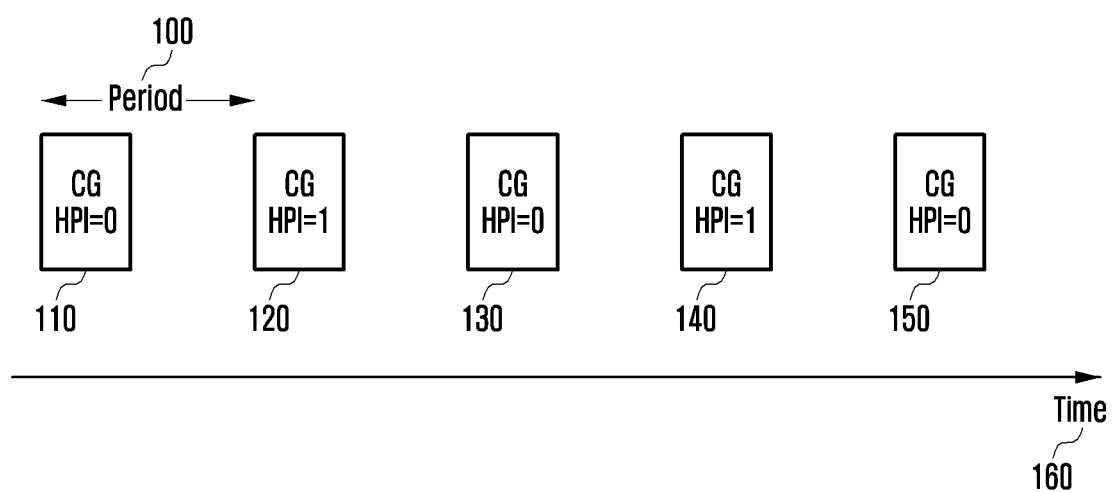
FIG. 1 illustrates an operation in which a configured grant (CG) and an HARQ process are configured according to an embodiment of the disclosure.

FIG. 1 illustrates an operation in which a configured grant (CG) and a hybrid automatic repeat request (HARQ) process are configured according to an embodiment of the disclosure.

FIG. 1 illustrates an example in which a configured grant is configured.

Referring to FIG. 1, configured grants 110, 120, 130, 140, and 150 are configured to have a predetermined period 100 on a time axis 160. A base station may configure each configured grant for a terminal, and here, a period for a configured grant, and a location, a size, a modulation and coding rate, etc. of a radio resource thereof may be configured. According to an embodiment, the configured grant may be activated immediately after configuration thereof or may be activated by a separate activation command. In a wireless communication system, a configured grant that is activated without a separate procedure immediately after configuration thereof may exist, and such a configured grant may be referred to as a Type 1 configured grant. On the other hand, a configured grant, which is not activated at a time point when configuration thereof is performed but is activated by a separate signal such as downlink control information (DCI), may exist, and such a configured grant may be referred to as a Type 2 configured grant. An activation message of the Type 2 configured grant may include at least one of a detailed resource location and information on a modulation & coding scheme (MCS). These configured grants may be assumed to have a fixed traffic pattern or to be used for high-priority data. In some embodiments, the configured grant may be dedicatedly assigned to data having short delay requirement. To this end, the base station may configure, in a terminal, whether a specific configured grant is usable for each specific logical channel, through an RRC configuration message (or a higher layer signaling). According to an embodiment, a plurality of configured grants may be configured in one terminal, and here, a period for each configured grant, and a location, a size, and a modulation and coding rate of a radio resource thereof may be differently configured.

One configured grant may use one or more HARQ processes, and an available HARQ process may be configured by a base station when a configured grant resource is configured. HARQ processes that are available for a configured grant may be determined based on the number of available HARQ processes and an HARQ process ID offset. The HARQ process ID (HPI) of HARQ processes that are available for a configured grant includes an HARQ process ID offset, and it is possible to use HARQ processes each having an HARQ process ID=(HARQ process ID offset)+ (number of available HARQ processes)-1. In the embodiment of FIG. 1, it is assumed that the HARQ process ID offset is configured to be 0 and the number of available HARQ processes is configured to be 2, but that may be changed. This may denote that a configured grant may alternately use two HARQ processes from HARQ process ID 0 to HARQ process ID 1.

Figure 2:
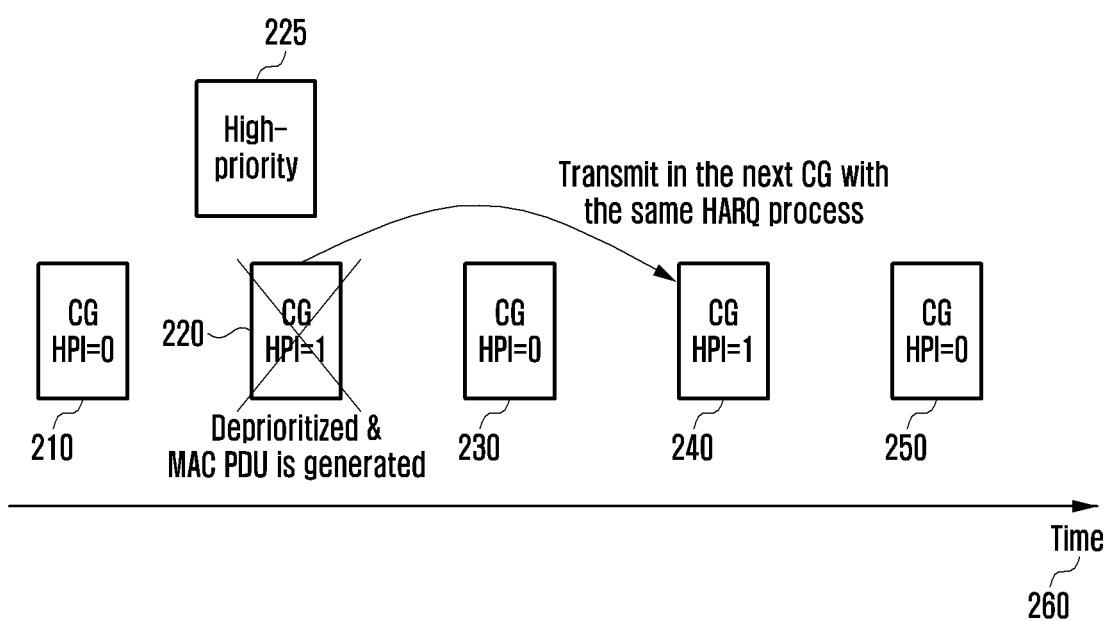
FIG. 2 illustrates an operation in which autonomous retransmission is performed in a configured grant according to an embodiment of the disclosure.

FIG. 2 illustrates an operation in which autonomous retransmission is performed in a configured grant according to an embodiment of the disclosure.

When configured grant resources 210, 220, 230, 240, and 250 overlap another resource (another uplink resource (uplink grant) or scheduling request transmission) on the time axis 260 or the time and frequency axis, and when the priority of the overlapped resource is higher than the priority of a configured grant resource, the configured grant resource has a lower priority (de-prioritized) and may not be used for transmission. Here, a medium access control protocol data unit (MAC PDU) that is transmittable in the configured grant resource may be already obtained from a multiplexing/ assembly device (entity) and generated in an HARQ buffer of a terminal. However, a base station that assigns a radio resource may not accurately know whether the MAC PDU exists in an HARQ buffer of a terminal for a de-prioritized configured grant resource, and thus may not assign a retransmission resource for the configured grant. To solve this problem, if an MAC PDU for a configured grant resource has already been generated and the MAC PDU has not been transmitted because the previous configured grant resource is de-prioritized, the MAC PDU may be transmitted in the next configured grant resource having the same HARQ process ID as that of the de-prioritized configured grant resource. This may be referred to as autonomous retransmission or autonomous transmission. In the disclosure, this is referred to as autonomous retransmission.

Referring to FIG. 2, when a first configured grant resource 220 of HARQ process ID 1 overlaps another uplink resource (uplink grant) 225 on the time axis 260, the uplink grant has a higher priority and thus is used for transmission, and the configured grant resource becomes a de-prioritized uplink grant and thus cannot be used for transmission. However, if a MAC PDU for the configured grant resource has already been obtained, the MAC PDU may be transmitted in the next configured grant resource 240 having the same HARQ process ID 1 as that of the configured grant resource 220. This autonomous retransmission operation may be applied only when the MAC PDU stored in the HARQ buffer is not retransmitted via a retransmission resource.

Figure 3:
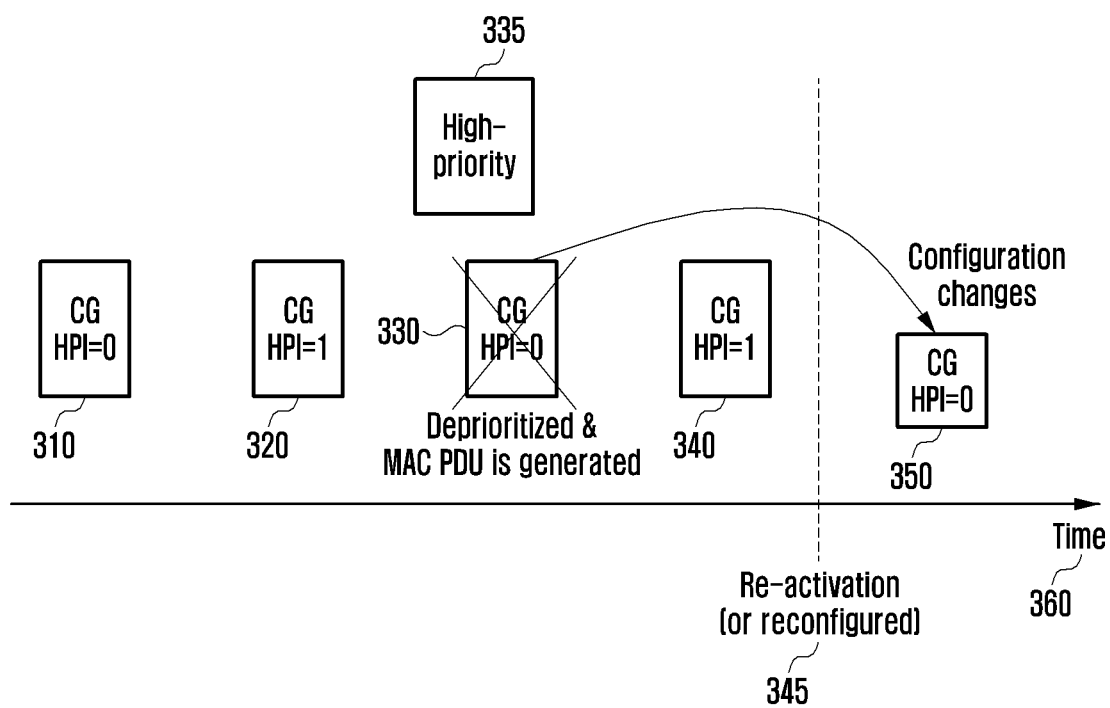
FIG. 3 illustrates a problem in an autonomous retransmission operation when a resource configuration of a configured grant is changed according to an embodiment of the disclosure.

FIG. 3 illustrates a problem in an autonomous retransmission operation when a resource configuration of a configured grant is changed according to an embodiment of the disclosure. When a configured grant resource has been configured, a base station may partially change the configuration of a configured grant according to a change in the channel state of a terminal, a change in the amount of data processed by the base station, or various other reasons. This configuration change may be configured through an RRC reconfiguration message (or a higher layer signaling), and a Type 2 configured grant may be reconfigured by an activation instruction through DCI of a physical downlink control channel (PDCCH) (or a layer 1 (L1) signaling). Here, reconfigurable information may include the size of a MAC PDU (transport block) of a configured grant, information on a modulation and coding scheme (MCS), and the like.

Referring to FIG. 3, one configured grant configuration is configured and radio resources 310, 320, 330, and 340 are configured, and then the characteristics of configured grant resources have been changed due to re-activation of the Type 2 configured grant or reconfiguration of the Type 1 or the Type 2 configured grant (indicated by reference numeral 345). In this embodiment, it is assumed that an HARQ process ID offset is configured to be 0 and the number of available HARQ processes is configured to be 2, but that may be changed. This may denote that the configured grant may alternately use two HARQ processes from HARQ process ID 0 to HARQ process ID 1. In operation 345, if the characteristics of configured grant resources are changed due to re-activation of the Type 2 configured grant or reconfiguration of the configured grant, the MAC PDU, which has been generated but has not been transmitted in the configured grant resource 330 that overlaps a high priority radio resource 335 on the time axis 360 and thus is de-prioritized, may not be transmitted as it is in the next radio resource 350, which has the same HARQ process ID as that of the de-prioritized configured grant resource 330, according to an autonomous retransmission method. For example, since the size of the configured grant resource is changed, transmission of the MAC PDU may not be performed as it is. In a case where the size of the resource is changed due to reactivation or reconfiguration or where configuration information of the configured grant is changed, it is difficult to say that performing autonomous retransmission considering the same configured grant configuration is the transmission operation intended in the communication system. Therefore, the disclosure proposes a method for solving the above problem.

Figure 4:
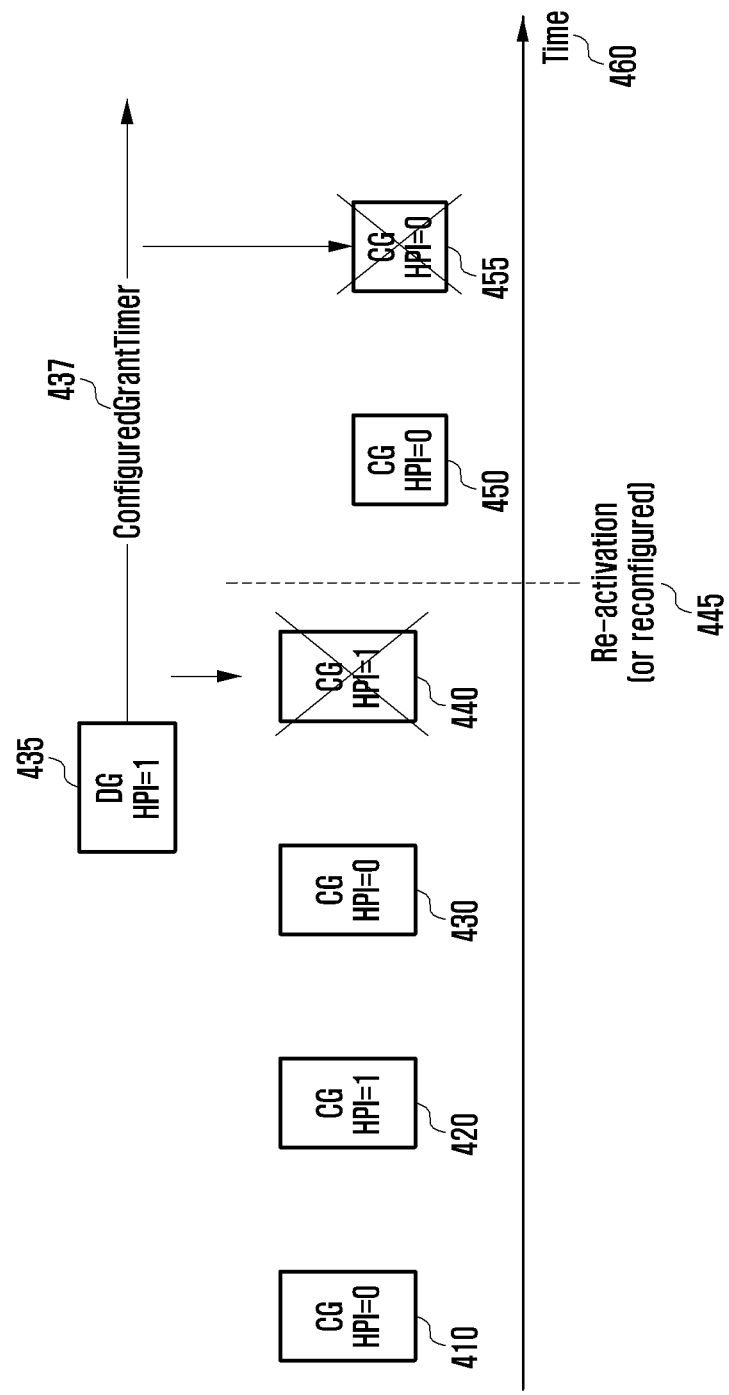
FIG. 4 illustrates an example of an operation state of a configured grant timer when a resource configuration of a configured grant is changed according to an embodiment of the disclosure.

FIG. 4 illustrates an example of an operation state of a configured grant timer when a resource configuration of a configured grant is changed according to an embodiment of the disclosure. When the configured grant resource is configured, a base station may partially change the configuration of a configured grant due to a change in the channel state of a terminal, a change in the amount of data processed by a base station, or various other reasons. This configuration change may be configured through an RRC reconfiguration message (or a higher layer signaling), and a Type 2 configured grant may be reconfigured by an activation instruction through DCI of a physical downlink control channel (PDCCH) channel (or L1 signaling). Here, reconfigurable information may include the size of a MAC PDU (transport block) of a configured grant, information on a modulation and coding scheme (MCS) information, and the like. An HARQ process used by a configured grant may be used by a dynamic grant (DG in FIG. 4) instead of the configured grant. The dynamic grant includes an uplink grant, which is assigned using a cell radio network temporary identity (C-RNTI), or an uplink grant, which is a retransmission resource of a configured grant and assigned using a configured scheduling radio network temporary identity (CS-RNTI). If a dynamic grant resource is assigned with respect to an HARQ process configured in a configured grant, the configured grant timer may run, and the configured grant resource may not be used while the configured grant timer is running.

Referring to FIG. 4, one configured grant configuration is configured and radio resources 410, 420, 430, and 440 are configured on the time axis 460, and then the characteristics of configured grant resources have been changed due to re-activation of the Type 2 configured grant or reconfiguration of the Type 1 or the Type 2 configured grant (indicated by reference numeral 445). In this embodiment, it is assumed that an HARQ process ID offset is configured to be 0 and the number of available HARQ processes is configured to be 2, but that may be changed. This may denote that the configured grant may alternately use two HARQ processes from HARQ process ID 0 to HARQ process ID 1. In operation 445, the characteristics of configured grant resources are changed due to re-activation of the Type 2 configured grant or reconfiguration of the configured grant, and thus the changed configured grant configurations are used in CGs 450 and 455. In the embodiment of FIG. 4, a dynamic grant 435 is assigned with respect to HARQ process ID 1 and thus a configured grant timer operates (indicated by reference numeral 437). Accordingly, the configured grant resources 440 and 455 having HARQ process ID 1 cannot be used for actual transmission. Although the configured grant configuration has been changed in operation 445, the configured grant resource having HARQ process ID 1 cannot be used for transmission due to operation of the configured grant timer.

Even if the characteristics of configured grant resources are changed due to reactivation of the Type 2 configured grant or the configuration of a configured grant (the case in which the same configuration is reactivated or reconfigured may be included), initialization where the HARQ buffer is emptied (or flushed) should be avoided because an HARQ process, in which a configured grant timer operates, is currently being used for transmission.

Figure 5:
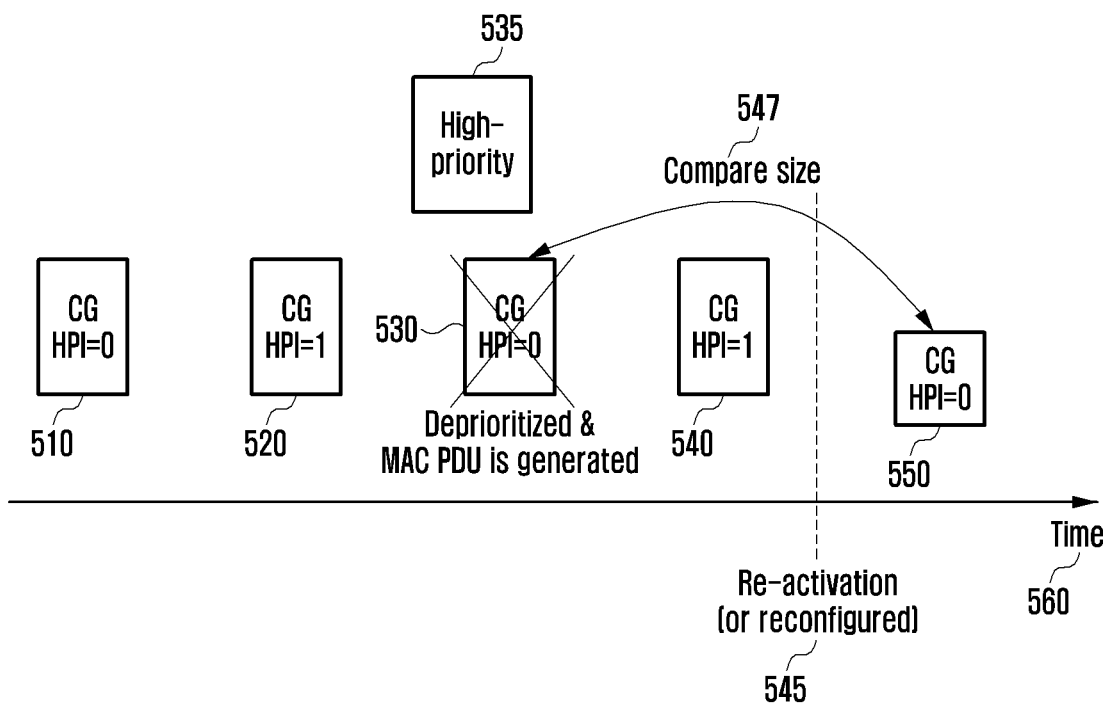
FIG. 5 illustrates a method of considering reactivation or reconfiguration of a resource when autonomous retransmission is performed according to an embodiment of the disclosure.

FIG. 5 illustrates a method of considering a reactivation or reconfiguration of a resource when autonomous retransmission is performed according to an embodiment of the disclosure. When a configured grant resource has been configured, a base station may partially change the configuration of a configured grant due to a change in the channel state of a terminal, a change in the amount of data processed by the base station, or various other reasons. This configuration change may be configured through an RRC reconfiguration message, and a Type 2 configured grant may be reconfigured by an activation instruction through DCI of a physical downlink control channel (PDCCH) channel. Here, reconfigurable information may include the size of a MAC PDU (transport block) of a configured grant, information on a modulation and coding scheme (MCS), and the like.

Referring to FIG. 5, one configured grant configuration is configured and radio resources 510, 520, 530, and 540 are configured on the time axis 560, and then the characteristics of configured grant resources have been changed due to re-activation of the Type 2 configured grant or reconfiguration of the Type 1 or the Type 2 configured grant (indicated by reference numeral 545). In this embodiment, it is assumed that an HARQ process ID offset is configured to be 0 and the number of available HARQ processes is configured to be 2, but that may be changed. This may denote that the configured grant may alternately use two HARQ processes from HARQ process ID 0 to HARQ process ID 1. In operation 545, if the characteristics of configured grant resources are changed due to re-activation of the Type 2 configured grant or reconfiguration of a configured grant, the MAC PDU, which has been generated but has not been transmitted in the configured grant resource 530 that overlaps a high priority radio resource 535 on the time axis and thus is de-prioritized, may not be transmitted as it is in the next radio resource 550, which has the same HARQ process ID as that of the de-prioritized configured grant resource 530, according to an autonomous retransmission method. For example, since the size of the configured grant resource is changed, transmission of the MAC PDU may not be performed as it is.

In order to solve this problem, according to the embodiment of FIG. 5, in the process of the HARQ entity operation of the configured grant resource 550 for autonomous retransmission, the size of the MAC PDU, which has already obtained and stored in the buffer of the HARQ process, is compared with the size of the configured grant resource (indicated by reference numeral 547). The size of the MAC PDU, which has already obtained and stored in the buffer of the HARQ process, may be the same as that of the de-prioritized previous configured grant resource 530. Accordingly, it is possible to determine whether to transmit the stored MAC PDU by determining whether the size of the stored MAC PDU is the same as or is larger or smaller than the size of the assigned configured grant 550.

For example, if the size of the MAC PDU having been stored in the HARQ buffer matches the size of the assigned configured grant, autonomous retransmission of the MAC PDU may be performed by considering that the MAC PDU has been obtained. In an embodiment, if the size of the MAC PDU having been stored in the HARQ buffer is equal to or smaller than the size of the assigned configured grant, autonomous retransmission of the MAC PDU may be performed by considering that the MAC PDU has been obtained. In an embodiment, if the size of the MAC PDU having been stored in the HARQ buffer is smaller than the size of the assigned configured grant, autonomous retransmission of the MAC PDU may be performed after adding an additional MAC service data unit (SDU) to resources that remain after inclusion of the MAC PDU. In an embodiment, if the size of the MAC PDU having been stored in the HARQ buffer is larger than the size of the assigned configured grant, the terminal may instruct a multiplexing/assembly device (entity) to include the MAC SDU included in the MAC PDU and obtain the MAC PDU, to perform transmission of the MAC PDU.

Figure 6:
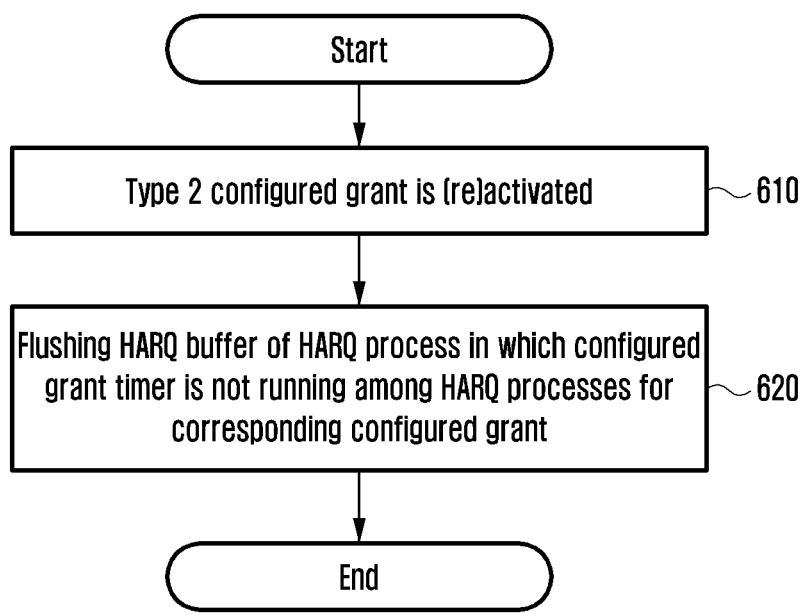
FIG. 6 illustrates an operation of a terminal for performing autonomous retransmission at a time point when a Type 2 configured grant is activated or reactivated according to an embodiment of the disclosure.

FIG. 6 illustrates an operation of a terminal for performing autonomous retransmission at a time point when a Type 2 configured grant is activated or reactivated according to an embodiment of the disclosure. When the configured grant resource is configured, the base station may partially change the configuration of the configured grant due to a change in the channel state of the terminal, a change in the amount of data processed by the base station, or various other reasons. In the case of a Type 2 configured grant, this configuration change may be reconfigured by an activation indication through DCI of a physical downlink control channel (PDCCH) (or layer 1 signaling). Here, reconfigurable information may include the size of a MAC PDU (transport block) of a configured grant, a location of a transmission resource, information on a modulation and coding scheme (MCS), and the like. If the Type 2 configured grant is activated or reactivated in operation 610, the characteristics of configured grant resources have been changed and thus an MAC PDU, which has been obtained but has not been transmitted because the previous configured grant resource is de-prioritized, may not be transmitted through autonomous retransmission even if the autonomous retransmission has been configured as described in FIG. 3. To this end, when the Type 2 configured grant is activated or reactivated, an HARQ buffer of an HARQ process in which a configured grant timer is not running among HARQ processes for the corresponding configured grant may be emptied (buffer flush) in operation 620. For example, if the HARQ process ID of a HARQ process used by a predetermined configured grant is 0, 1, and 2 and a configured grant timer of HARQ process ID 1 is running, HARQ buffers of HARQ processes having HARQ process ID 0 and HARQ process ID 2, in which the configured grant timer is not running, may be emptied (or flushed). In some embodiments, in operation 620, an operation of emptying the HARQ buffer of the HARQ process in which a configured grant timer is not running, the HARQ process being started in a resource assigned using C-RNTI or CS-RNTI, among HARQ processes for the corresponding configured grant, may be performed. As described in FIG. 4, since transmission in a dynamic grant is currently being performed in an HARQ process in which a configured grant timer is running, if the HARQ buffer is emptied (or flushed), data loss in the HARQ process in which the transmission is being performed may occur. Therefore, the HARQ buffer of the HARQ process in which the configured grant timer is running cannot be emptied (or flushed).

In some embodiments, there may be no difference in configuration method between the activation of the Type 2 configured grant and the re-activation thereof, and the re-activation may refer to re-instruction of activation of the Type 2 configured grant that has been previously configured and activated.

Referring to FIG. 6, in a case where the Type 2 configured grant is activated or reactivated in operation 610, operation 620 may be applied thereto. However, in an embodiment, when the Type 2 configured grant is deactivated and cleared, an operation of emptying the HARQ buffer according to the operation of the configured grant timer described in operation 620 may be performed.

Figure 7:
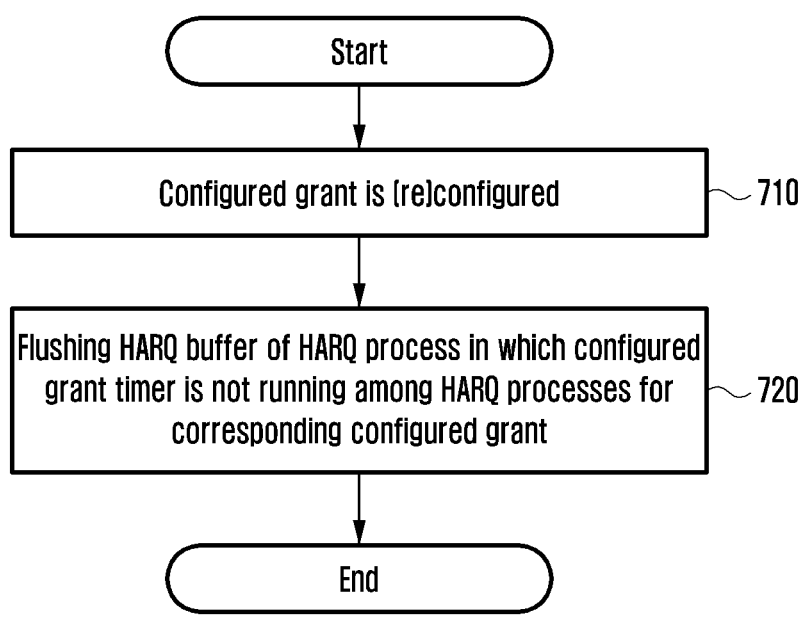
FIG. 7 illustrates an operation of a terminal for performing autonomous retransmission at a time point when a configured grant is configured or reconfigured according to an embodiment of the disclosure.

FIG. 7 illustrates an operation of a terminal for performing autonomous retransmission at a time point when a configured grant is configured or reconfigured according to an embodiment of the disclosure. When a configured grant resource has been configured, a base station may partially change the configuration of a configured grant due to a change in the channel state of the terminal, a change in the amount of data processed by the base station, or various other reasons. The configuration change may be configured or reconfigured through an RRC reconfiguration message (or a higher layer signaling). In the case of the Type 1 configured grant, information configurable or reconfigurable through the RRC reconfiguration message may include the size of a MAC PDU (transport block) of a configured grant, a location of a transmission resource, information on a modulation and coding scheme (MCS), and the like. In the case of the Type 1 configured grant and Type 2 configured grant, a period of a configured grant may be reconfigured through the RRC reconfiguration message. When the Type 1 configured grant is configured or reconfigured in operation 710, since the characteristics of configured grant resources have been changed, a MAC PDU, which has been obtained but has not been transmitted because the previous configured grant resource is de-prioritized, may not be transmitted through autonomous retransmission even if the autonomous retransmission has been configured as described in FIG. 3. To this end, when the configured grant is configured or reconfigured, an HARQ buffer of an HARQ process in which a configured grant timer is not running among HARQ processes for the corresponding configured grant may be emptied (buffer flush) in operation 720. For example, if the HARQ process ID of the HARQ process used by a predetermined configured grant is 0, 1, and 2 and a configured grant timer of HARQ process ID 1 is running, HARQ buffers of HARQ processes for HARQ process ID 0 and HARQ process ID 2, in which the configured grant timer is not running, may be emptied (or flushed). In some embodiments, in operation 720, an operation of emptying the HARQ buffer of the HARQ process in which a configured grant timer is not running, the HARQ process being started in a resource assigned using C-RNTI or CS-RNTI, among HARQ processes for the corresponding configured grant, may be performed. As described in FIG. 4, since transmission in a dynamic grant is currently being performed in an HARQ process in which a configured grant timer is running, if the HARQ buffer is emptied (or flushed), data loss in the HARQ process in which the transmission is being performed may occur. Therefore, the HARQ buffer of the HARQ process in which the configured grant timer is running cannot be emptied (or flushed).

In some embodiments, there may be no difference in configuration method between the configuration of a configured grant and the re-activation thereof, and the re-activation may refer to re-instruction of activation of a configured grant that has been previously configured and activated.

Referring to FIG. 7, regardless of whether the configured grant is the Type 1 configured grant or the Type 2 configured grant in operation 710, the process proceeds to operation 720. However, in an embodiment, only when the Type 1 configured grant is configured or reconfigured, an operation of emptying the HARQ buffer according to the operation of the configured grant timer described in operation 720 may be performed. In the embodiment of FIG. 7, in a case where the configured grant is configured or reconfigured in operation 710, operation 720 may be applied. However, in an embodiment, when the configured grant is released or cleared, an operation of emptying the HARQ buffer according to the operation of the configured grant timer described in operation 720 may be performed.

Figure 8:
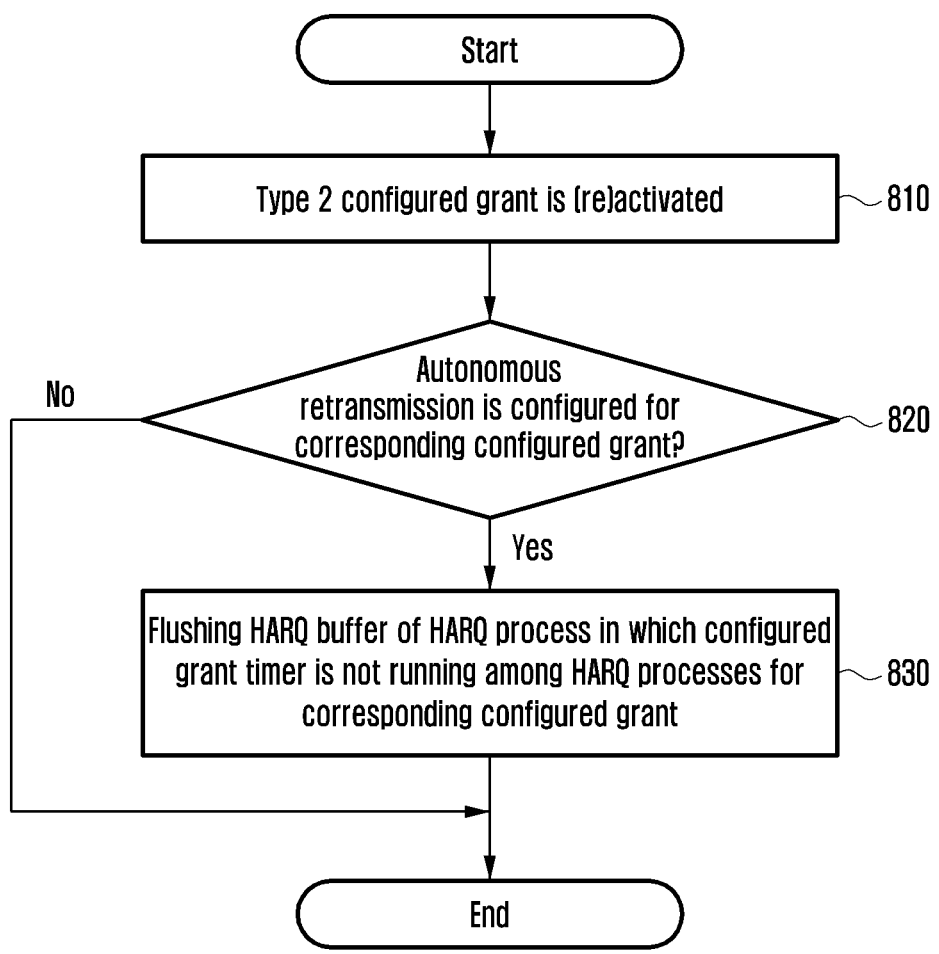
FIG. 8 illustrates an operation of a terminal for performing autonomous retransmission at a time point when a Type 2 configured grant is activated or reactivated according to an embodiment of the disclosure.

FIG. 8 illustrates an operation of a terminal for performing autonomous retransmission at a time point when a Type 2 configured grant is activated or reactivated according to an embodiment of the disclosure. When a configured grant resource has been configured, a base station may partially change the configuration of a configured grant due to a change in the channel state of the terminal, a change in the amount of data processed by the base station, or various other reasons. In the case of Type 2 configured grant, this configuration change may be reconfigured by an activation instruction through DCI of a physical downlink control channel (PDCCH) (or L1 signaling). Here, reconfigurable information may include the size of a MAC PDU (transport block) of a configured grant, a location of a transmission resource, information on a modulation and coding scheme (MCS), and the like. When the Type 2 configured grant is activated or reactivated in operation 810, since the characteristics of configured grant resources have been changed, an MAC PDU, which has been obtained but has not been transmitted because the previous configured grant resource is de-prioritized, may not be transmitted through autonomous retransmission even if the autonomous retransmission has been configured as described in FIG. 3. To this end, it may be identified whether autonomous retransmission for the corresponding configured grant is configured in operation 820. If autonomous retransmission is configured for the configured grant, when the Type 2 configured grant is activated or reactivated, an HARQ buffer of an HARQ process in which a configured grant timer is not running among HARQ processes for the corresponding configured grant may be emptied (buffer flush) in operation 830. For example, if the HARQ process ID of a HARQ process used by a predetermined configured grant is 0, 1, and 2 and a configured grant timer of HARQ process ID 1 is running, HARQ buffers of HARQ processes for HARQ process ID 0 and HARQ process ID 2, in which the configured grant timer is not running, may be emptied (or flushed). In some embodiments, in operation 830, an operation of emptying the HARQ buffer of the HARQ process in which a configured grant timer is not running, the HARQ process being started in a resource assigned using C-RNTI or CS-RNTI, among HARQ processes for the corresponding configured grant, may be performed. As described in FIG. 4, since transmission in a dynamic grant is currently being performed in an HARQ process in which a configured grant timer is running, if the HARQ buffer is emptied (or flushed), data loss in the HARQ process in which the transmission is being performed may occur. Therefore, the HARQ buffer of the HARQ process in which the configured grant timer is running cannot be emptied (or flushed).

In some embodiments, there may be no difference in configuration method between the activation of the Type 2 configured grant and the re-activation thereof, and the re-activation may refer to re-instruction of activation of the Type 2 configured grant that has been previously configured and activated.

Referring to FIG. 8, with respect to a case in which the Type 2 configured grant is activated or reactivated in operation 810, the process proceeds to operation 830 through operation 820. However, in an embodiment, when the Type 2 configured grant is deactivated and cleared, an operation of emptying the HARQ buffer may be performed according to the operation of the configured grant timer described in operations 820 and 830.

Figure 9:
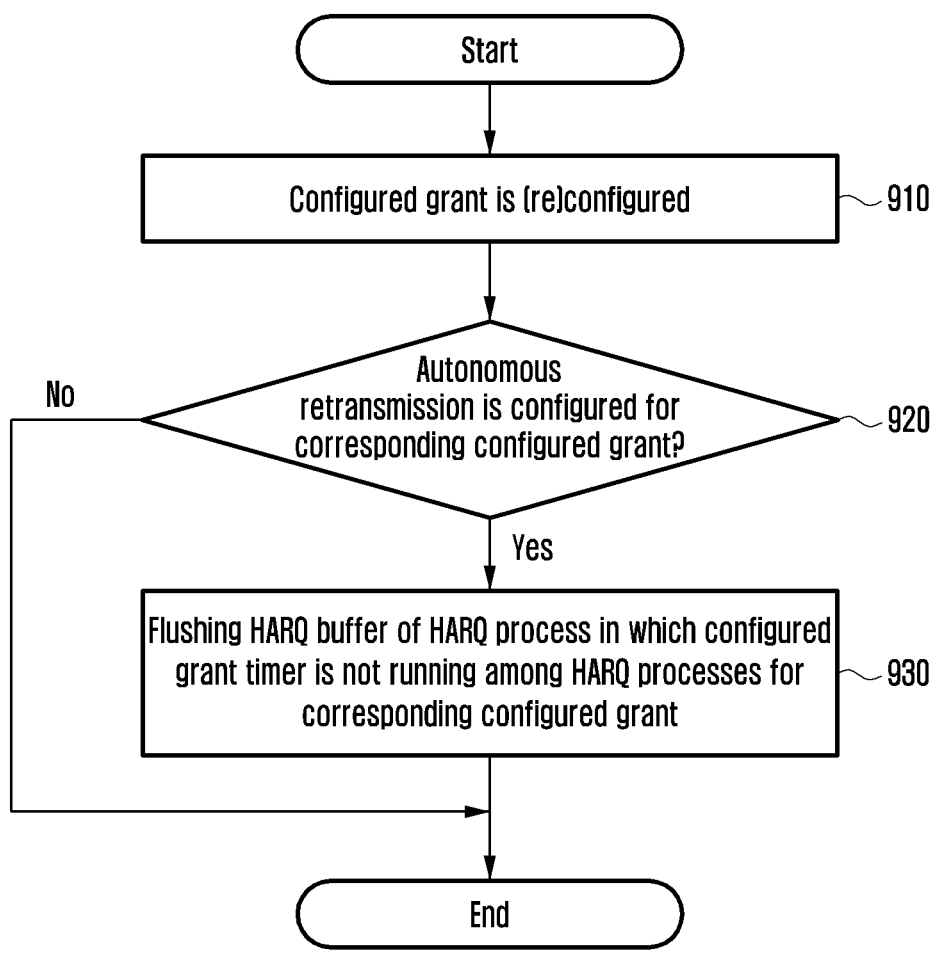
FIG. 9 illustrates an operation of a terminal for performing autonomous retransmission at a time point when a configured grant is configured or reconfigured according to an embodiment of the disclosure.

FIG. 9 illustrates an operation of a terminal for performing autonomous retransmission at a time point when a configured grant is configured or reconfigured according to an embodiment of the disclosure. When a configured grant resource is configured, the base station may partially change the configuration of a configured grant due to a change in the channel state of the terminal, a change in the amount of data processed by the base station, or various other reasons. The configuration change may be configured or reconfigured through an RRC reconfiguration message (or a higher layer signaling). In the case of the Type 1 configured grant, information configurable or reconfigurable by the RRC reconfiguration message may include the size of a MAC PDU (transport block) of a configured grant, a location of a transmission resource, information on a modulation and coding scheme (MCS), and the like. In the case of the Type 1 configured grant and Type 2 configured grant, a period of a configured grant may be reconfigured through the RRC reconfiguration message. When the Type 1 configured grant is configured or reconfigured in operation 910, since the characteristics of configured grant resources have been changed, an MAC PDU, which has been obtained but has not been transmitted because the previous configured grant resource is de-prioritized, may not be transmitted through autonomous retransmission even if the autonomous retransmission has been configured as described in FIG. 3. To this end, it may be identified whether autonomous retransmission for the corresponding configured grant is configured in operation 920. If autonomous retransmission is configured for the configured grant, when the configured grant is configured or reconfigured, an HARQ buffer of an HARQ process in which a configured grant timer is not running among HARQ processes for the corresponding configured grant may be emptied (buffer flush) in operation 930. For example, if the HARQ process ID of a HARQ process used by a predetermined configured grant is 0, 1, and 2 and a configured grant timer of HARQ process ID 1 is running, HARQ buffers of HARQ processes for HARQ process ID 0 and HARQ process ID 2, in which the configured grant timer is not running, may be emptied (or flushed). In some embodiments, in operation 930, an operation of emptying the HARQ buffer of the HARQ process in which a configured grant timer is not running, the HARQ process being started in a resource assigned using C-RNTI or CS-RNTI among HARQ processes for the corresponding configured grant, may be performed. As described in FIG. 4, since transmission in a dynamic grant is currently being performed in an HARQ process in which a configured grant timer is running, if the HARQ buffer is emptied (or flushed), data loss in the HARQ process in which the transmission is being performed may occur. Therefore, the HARQ buffer of the HARQ process in which the configured grant timer is running cannot be emptied (or flushed).

In some embodiments, there may be no difference in configuration method between the configuration of a configured grant and the re-activation thereof, and the re-activation may refer to re-instruction of activation of a configured grant that has been previously configured and activated.

Referring to of FIG. 9, regardless of whether the configured grant is the Type 1 configured grant or the Type 2 configured grant in operation 910, the process proceeds to operation 930 through operation 920. However, in an embodiment, only when the Type 1 configured grant is configured or reconfigured, an operation of emptying the HARQ buffer according to the operation of the configured grant timer described in operation 930 may be performed. In the embodiment of FIG. 9, in a case where the configured grant is configured or reconfigured in operation 910, operations 920 and 930 may be performed. However, in an embodiment, when the configured grant is released or cleared, an operation of emptying the HARQ buffer may be performed according to the operation of the configured grant timer described in operations 920 and 930.

Figure 10:
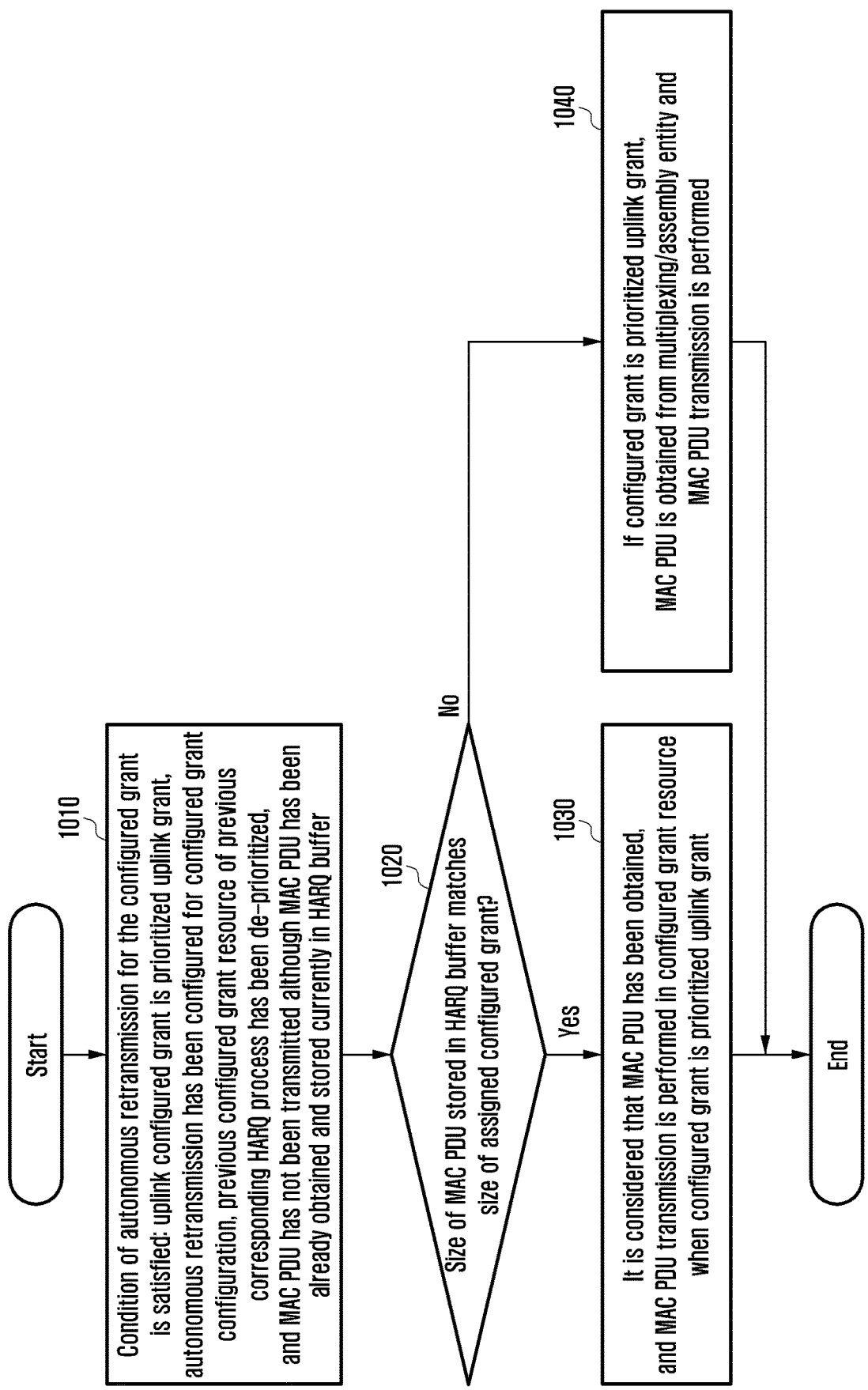
FIG. 10 illustrates an operation of a terminal considering (re)activation or (re)configuration of a resource when autonomous retransmission is performed according to an embodiment of the disclosure.

FIG. 10 illustrates an operation of a terminal considering (re)activation or (re)configuration of resources when autonomous retransmission is performed according to an embodiment of the disclosure. When a configured grant resource has been configured, a base station may partially change the configuration of a configured grant according to a change in the channel state of a terminal, a change in the amount of data processed by the base station, or various other reasons. This configuration change may be configured through an RRC reconfiguration message, and a Type 2 configured grant may be reconfigured by an activation instruction through DCI of a physical downlink control channel (PDCCH). Here, reconfigurable information may include the size of a MAC PDU (transport block) of a configured grant, information on a modulation and coding scheme (MCS), and the like.

As such, when the configured grant resource is reconfigured through the RRC reconfiguration message or the activation or reactivation of the Type 2 configured grant, the configured grant needs to be a resource capable of transmitting an MAC PDU, which has been obtained and stored in the HARQ buffer, in order to perform autonomous retransmission.

Referring to FIG. 10, a condition in which autonomous retransmission for the configured grant in a MAC device (or entity) is satisfied is assumed in operation 1010. The condition may denote the case in which an uplink configured grant is a prioritized uplink grant, autonomous retransmission has been configured for the configured grant configuration, the previous configured grant resource of the previous corresponding HARQ process has been de-prioritized, and the MAC PDU has not been transmitted although the MAC PDU has been already obtained and stored currently in the HARQ buffer. However, the case satisfying autonomous retransmission for a configured grant may denote the case where the uplink grant is a configured grant for which autonomous retransmission is configured, the previous configured grant resource of the previous corresponding HARQ process has been de-prioritized, and the MAC PDU has not been transmitted although the MAC PDU has been already obtained and stored currently in the HARQ buffer.

Here, it is possible to identify whether the size of the MAC PDU having been stored in the HARQ buffer matches the size of the assigned configured grant in operation 1020. The identification is related to whether the stored MAC PDU is transmittable to the corresponding configured grant, and one of the following two methods may be applied therefor.

Method 1: The size of the stored MAC PDU matches the size of the MAC PDU that is transmittable in the assigned configured grant. In this case, since the configuration of the configured grant has not changed or the configuration thereof has been changed to have the same size as that of the stored MAC PDU, the MAC PDU may be transmitted in the configured grant as it is.

Method 2: The size of the stored MAC PDU is equal to or smaller than the size of the MAC PDU that is transmittable in the assigned configured grant. In this case, since the configuration of the configured grant has not changed or the MAC PDU size of the configured grant has been changed to be larger that of the previous configuration, the MAC PDU may be transmitted in the configured grant as it is. If the size of the MAC PDU that is transmittable in the configured grant is larger than the size of the stored MAC PDU, padding may be included in resources that remain after inclusion of the stored MAC PDU.

If the size of the MAC PDU having been stored in the HARQ buffer matches the size of the assigned configured grant, it is considered that the MAC PDU has been obtained, and transmission of the MAC PDU may be performed in the configured grant resource when the configured grant is a prioritized uplink grant in operation 1030. Here, performing of the transmission of the MAC PDU may denote that new transmission is triggered for the HARQ process. Autonomous retransmission may be performed due to operation 1030.

Otherwise, if the size of the MAC PDU having been stored in the HARQ buffer does not match the size of the assigned configured grant, the MAC PDU is obtained from the multiplexing/assembly device (or entity) and transmission of the MAC PDU is performed in a case where the configured grant is a prioritized uplink grant in operation 1040. This may denote that new transmission for a newly obtained MAC PDU is triggered, since the MAC PDU is obtained, instead of performing autonomous retransmission.

Figure 11:
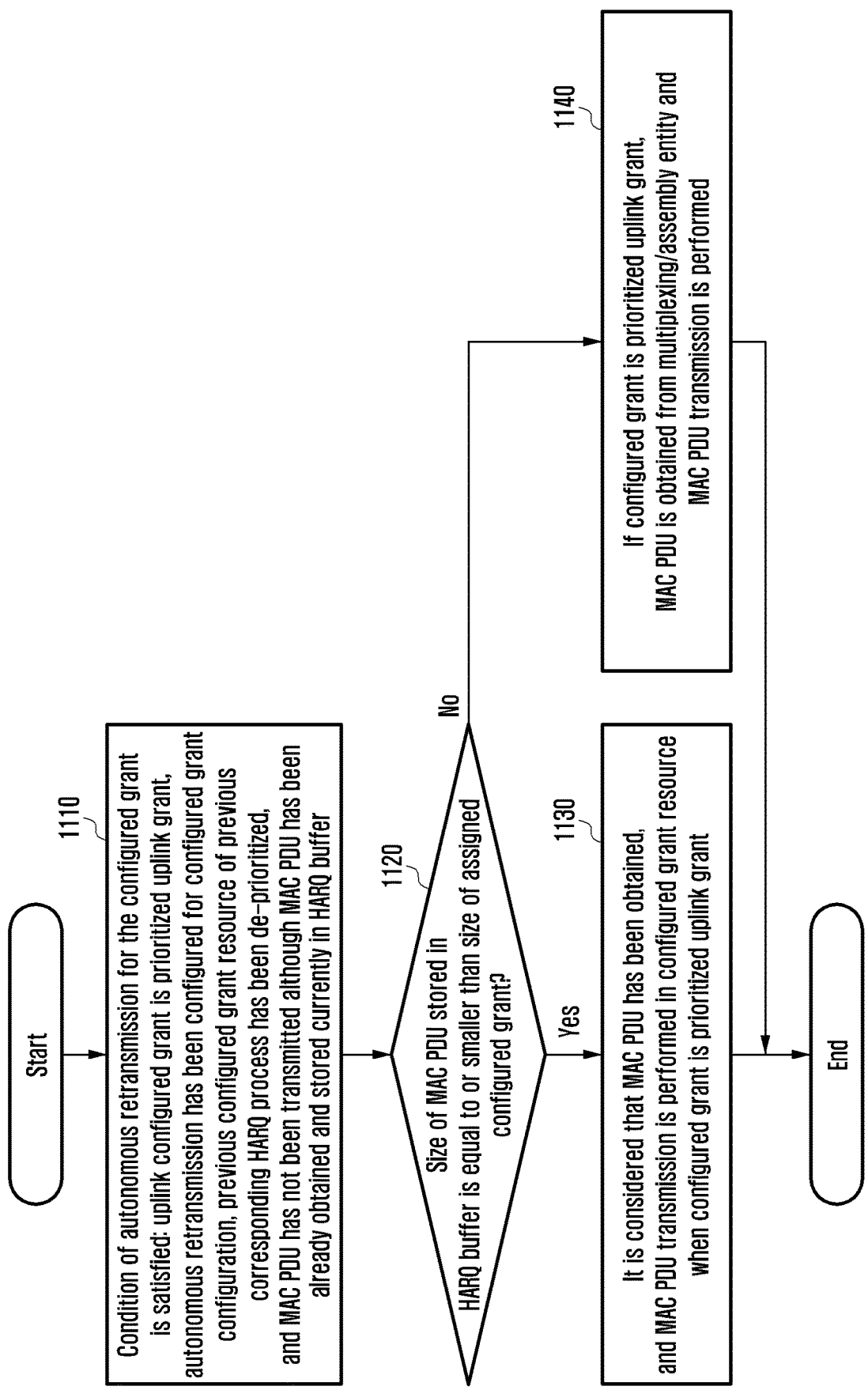
FIG. 11 illustrates an operation of a terminal considering (re)activation or (re)configuration of a resource when autonomous retransmission is performed according to an embodiment of the disclosure.

FIG. 11 illustrates an operation of a terminal considering (re)activation or (re)configuration of a resource when autonomous retransmission is performed according to an embodiment of the disclosure. When a configured grant resource has been configured, a base station may partially change the configuration of the configured grant due to a change in the channel state of the terminal, a change in the amount of data processed by the base station, or various other reasons. This configuration change may be configured through an RRC reconfiguration message, or in the case of a Type 2 configured grant, the configuration thereof may be reconfigured by an activation instruction through DCI of a physical downlink control channel (PDCCH) channel. Here, reconfigurable information may include the size of a MAC PDU (transport block) of the configured grant, information on a modulation and coding scheme (MCS), and the like.

As such, when the configured resource is reconfigured through the RRC reconfiguration message or activation or reactivation of the Type 2 configured grant, the configured CG needs to be a resource capable of transmitting a MAC PDU, which has been obtained and stored in the HARQ buffer, in order to perform autonomous retransmission.

Referring to FIG. 11, a condition in which autonomous retransmission for the configured grant in a MAC device (or entity) is satisfied is assumed in operation 1110. This may denote a case in which an uplink configured grant is a prioritized uplink grant, autonomous retransmission has been configured for the configured grant configuration, the previous configured grant resource of the previous corresponding HARQ process has been de-prioritized, and the MAC PDU has not been transmitted although the MAC PDU has been already obtained and stored currently in the HARQ buffer. However, in an embodiment, the case satisfying the autonomous retransmission for the configured grant may denote the case where the uplink grant is a configured grant for which autonomous retransmission is configured, the previous configured grant resource of the previous corresponding HARQ process has been de-prioritized, and the MAC PDU has not been transmitted although the MAC PDU has been already obtained and stored currently in the HARQ buffer.

Here, it is possible to identify whether the size of the MAC PDU having been stored in the HARQ buffer matches the size of the assigned configured grant in operation 1120. The identification is an operation of identifying a condition relating to whether the stored MAC PDU is transmittable to the corresponding configured grant. If operation 1120 is satisfied, this may denote that the configuration of the configured grant has not changed, or that the size of the MAC PDU of the configured grant has been changed to be larger than that of the MAC PDU in the previous configuration. Therefore, the MAC PDU can be transmitted in the configured grant as it is. If the size of the MAC PDU that can be transmitted in the configured grant is larger than the size of the stored MAC PDU, padding may be included in resources that remain after inclusion of the stored MAC PDU.

If the size of the MAC PDU having been stored in the HARQ buffer is equal to or smaller than the size of the assigned configured grant, it is considered that the MAC PDU has been obtained, and transmission of the MAC PDU may be performed in the configured grant resource when the configured grant is a prioritized uplink grant in operation 1130. Here, performing of the transmission of the MAC PDU may denote that new transmission is triggered for the HARQ process. Autonomous retransmission may be performed due to operation 1130.

Otherwise, if the size of the MAC PDU having been stored in the HARQ buffer is larger than the size of the assigned configured grant, the MAC PDU is obtained from the multiplexing/assembly device (or entity) and transmission of the MAC PDU may be performed in a case where the configured grant is a prioritized uplink grant in operation 1140. This may denote that new transmission for a newly obtained MAC PDU is triggered, since the MAC PDU is obtained, instead of performing autonomous retransmission.

Figure 12:
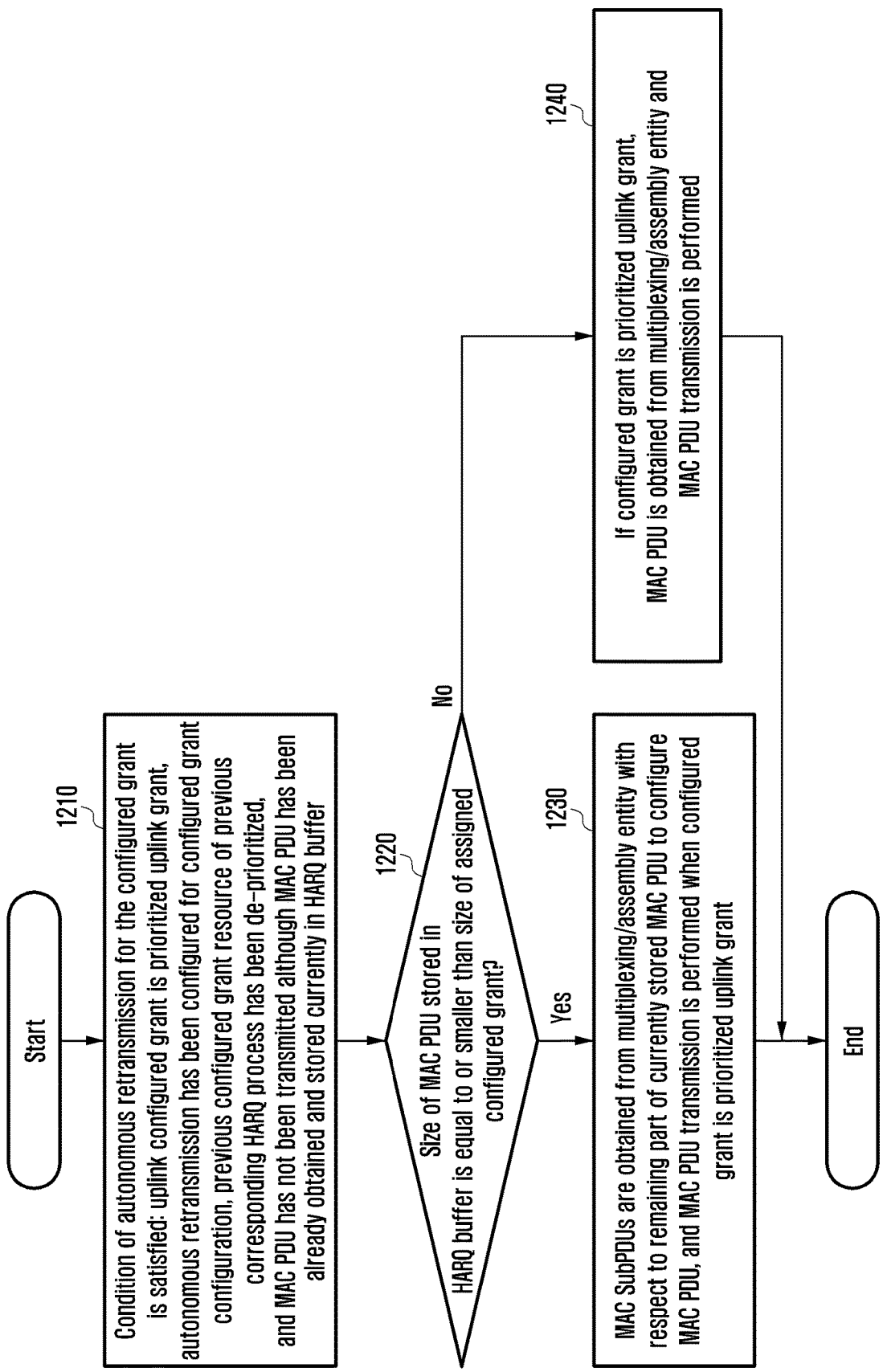
FIG. 12 illustrates an operation of a terminal considering (re)activation or (re)configuration of a resource when autonomous retransmission is performed according to an embodiment of the disclosure.

FIG. 12 illustrates an operation of a terminal considering (re)activation or (re)configuration of a resource when autonomous retransmission is performed according to an embodiment of the disclosure. When a configured grant resource has been configured, a base station may partially change the configuration of the configured grant due to a change in the channel state of the terminal, a change in the amount of data processed by the base station, or various other reasons. This configuration change may be configured through an RRC reconfiguration message, or in the case of a Type 2 configured grant, the configuration thereof may be reconfigured by an activation instruction through DCI of a physical downlink control channel (PDCCH) channel. Here, reconfigurable information may include the size of a MAC PDU (transport block) of the configured grant, information on a modulation and coding scheme (MCS), and the like.

As such, when the configured resource is reconfigured through the RRC reconfiguration message or activation or reactivation of the Type 2 configured grant, the configured CG needs to be a resource capable of transmitting a MAC PDU, which has been obtained and stored in the HARQ buffer, in order to perform autonomous retransmission.

Referring to FIG. 12, a condition in which autonomous retransmission for the configured grant in a MAC device (or entity) is satisfied is assumed in operation 1210. This may denote a case in which an uplink configured grant is a prioritized uplink grant, autonomous retransmission has been configured for the configured grant configuration, the previous configured grant resource of the previous corresponding HARQ process has been de-prioritized, and the MAC PDU has not been transmitted although the MAC PDU has been already obtained and stored currently in the HARQ buffer. However, in an embodiment, the condition satisfying the autonomous retransmission for the configured grant may denote the case in which the uplink grant is a configured grant for which autonomous retransmission is configured, the previous configured grant resource of the previous corresponding HARQ process has been de-prioritized, and the MAC PDU has not been transmitted although the MAC PDU has been already obtained and stored currently in the HARQ buffer.

Here, it is possible to identify whether the size of the MAC PDU having been stored in the HARQ buffer is equal to or smaller than the size of the assigned configured grant in operation 1220. The identification is an operation of identifying a condition relating to whether the stored MAC PDU is transmittable in the corresponding configured grant. If operation 1220 is satisfied, this may denote that the configuration of the configured grant has not changed, or that the size of the MAC PDU of the configured grant has been changed to be larger than that of the MAC PDU in the previous configuration. Therefore, the MAC PDU may be transmitted in the configured grant as it is. If the size of the MAC PDU that is transmittable in the configured grant is larger than the size of the stored MAC PDU, MAC SDUs (or MAC SubPDUs) are additionally included in resources that remain after inclusion of the stored MAC PDU or padding may be included therein.

If the size of the MAC PDU having been stored in the HARQ buffer is equal to or smaller than the size of the assigned configured grant, MAC SDUs (or MAC SubPDUs) are obtained from a multiplexing/assembly device (or entity) with respect to the remaining part of the currently stored MAC PDU to configure the MAC PDU and, when the configured grant is a prioritized uplink grant, transmission of the MAC PDU may be performed in the configured grant resource in operation 1230. Here, performing of the transmission of the MAC PDU may denote that new transmission is triggered for the HARQ process. If the MAC SDUs (or MAC SubPDUs) are additionally obtained, it may be considered that the entire MAC PDU is obtained. Operation 1230 may produce the same effect as when the MAC PDU having been stored for autonomous retransmission is autonomously retransmitted. For example, if the size of the stored MAC PDU is 300 bytes, and if the size of the MAC PDU that is transmittable in the configured grant is 500 bytes, MAC SDUs (or MAC SubPDUs) may be obtained from the multiplexing/assembly device (or entity) with respect to the remaining 200 bytes, thereby obtaining 500 bytes of MAC PDU to be transmitted finally.

Otherwise, if the size of the MAC PDU having been stored in the HARQ buffer is larger than the size of the assigned configured grant, the MAC PDU is obtained from the multiplexing/assembly device (or entity) and transmission of the MAC PDU may be performed when the configured grant is a prioritized uplink grant in operation 1240. This may denote that new transmission for a newly obtained MAC PDU is triggered, since the MAC PDU is obtained, instead of performing autonomous retransmission.

Figure 13:
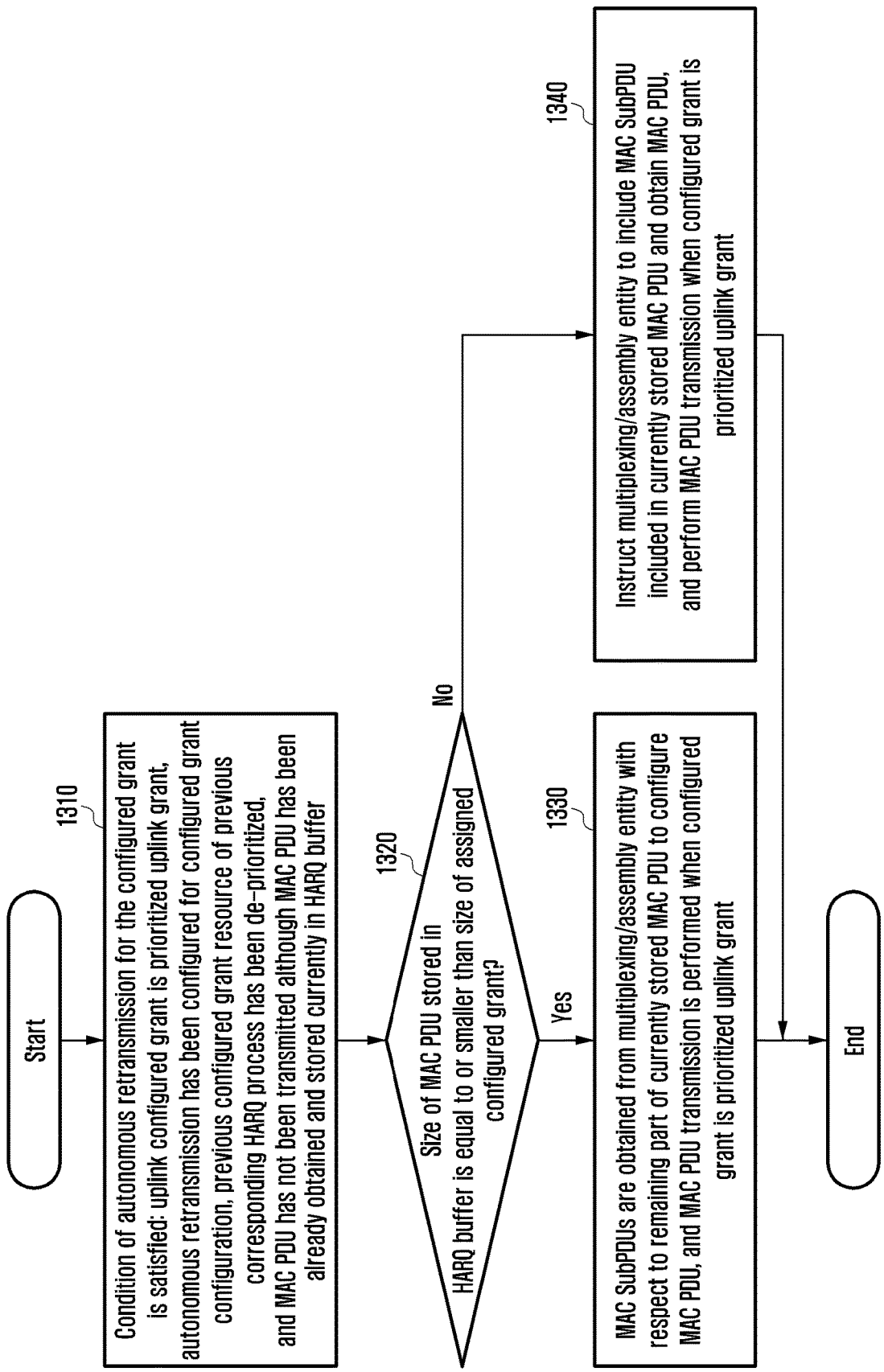
FIG. 13 illustrates an operation of a terminal considering (re)activation or (re)configuration of a resource when autonomous retransmission is performed according to an embodiment of the disclosure.

FIG. 13 illustrates an operation of a terminal considering (re)activation or (re)configuration of a resource when autonomous retransmission is performed according to an embodiment of the disclosure. When a configured grant resource has been configured, a base station may partially change the configuration of the configured grant due to a change in the channel state of the terminal, a change in the amount of data processed by the base station, or various other reasons. This configuration change may be configured through an RRC reconfiguration message (or a higher layer signaling), or in the case of a Type 2 configured grant, the configuration thereof may be reconfigured by an activation instruction through DCI of a physical downlink control channel (PDCCH) channel (or L1 signaling). Here, reconfigurable information may include the size of a MAC PDU (transport block) of the configured grant, information on a modulation and coding scheme (MCS), and the like.

As such, when the configured resource is reconfigured through the RRC reconfiguration message or activation or reactivation of the Type 2 configured grant, the configured CG needs to be a resource capable of transmitting a MAC PDU, which has been obtained and stored in the HARQ buffer, in order to perform autonomous retransmission.

Referring to FIG. 13, a condition in which autonomous retransmission for the configured grant in a MAC device (or entity) is satisfied is assumed in operation 1310. This may denote a case in which an uplink configured grant is a prioritized uplink grant, autonomous retransmission has been configured for the configured grant configuration, the previous configured grant resource of the previous corresponding HARQ process has been de-prioritized, and the MAC PDU has not been transmitted although the MAC PDU has been already obtained and stored currently in the HARQ buffer. However, in an embodiment, the case satisfying autonomous retransmission for the configured grant may denote the case where the uplink grant is a configured grant for which autonomous retransmission is configured, the previous configured grant resource of the previous corresponding HARQ process has been de-prioritized, and the MAC PDU has not been transmitted although the MAC PDU has been already obtained and stored currently in the HARQ buffer.

Here, it is possible to identify whether the size of the MAC PDU having been stored in the HARQ buffer is equal to or smaller than the size of the assigned configured grant in operation 1320. That is, the identification is an operation of identifying a condition relating to whether the stored MAC PDU is transmittable to the corresponding configured grant. If operation 1320 is satisfied, this may denote that the configuration of the configured grant has not changed, or that the size of the MAC PDU of the configured grant has been changed to be larger than that of the MAC PDU in the previous configuration. Therefore, the MAC PDU can be transmitted in the configured grant as it is. If the size of the MAC PDU that is transmittable in the configured grant is larger than the size of the stored MAC PDU, MAC SDUs (or MAC SubPDUs) are additionally included in resources that remain after inclusion of the stored MAC PDU or padding may be included therein.

If the size of the MAC PDU having been stored in the HARQ buffer is equal to or smaller than the size of the assigned configured grant, MAC SDUs (or MAC SubPDUs) are obtained from a multiplexing/assembly device (or entity) with respect to the remaining part of the currently stored MAC PDU to configure the MAC PDU and, when the configured grant is a prioritized uplink grant, transmission of the MAC PDU may be performed in the configured grant resource in operation 1330. Here, performing of the transmission of the MAC PDU may denote that new transmission is triggered for the HARQ process. If the MAC SDUs (or MAC SubPDUs) are additionally obtained, it may be considered that the entire MAC PDU is obtained. Operation 1330 may produce the same effect as when the MAC PDU having been stored for the autonomous retransmission is autonomously retransmitted. For example, if the size of the stored MAC PDU is 300 bytes, and if the size of the MAC PDU that is transmittable in the configured grant is 500 bytes, MAC SDUs (or MAC SubPDUs) may be obtained from the multiplexing/assembly device (or entity) with respect to the remaining 200 bytes, thereby obtaining 500 bytes of MAC PDU to be transmitted finally.

Otherwise, if the size of the MAC PDU having been stored in the HARQ buffer is larger than the size of the assigned configured grant, the terminal may instruct the multiplexing/assembly device (or entity) to include the MAC SubPDU included in the currently stored MAC PDU and acquire the MAC PDU, and may transmit the MAC PDU when the configured grant is a prioritized uplink grant in operation 1340. This may denote that new transmission of the newly obtained MAC PDU is triggered, since the MAC PDU is obtained, instead of performing autonomous retransmission, thereby producing the same effect as when a part of the MAC PDU having been stored for autonomous retransmission is autonomously retransmitted.

Figure 14:
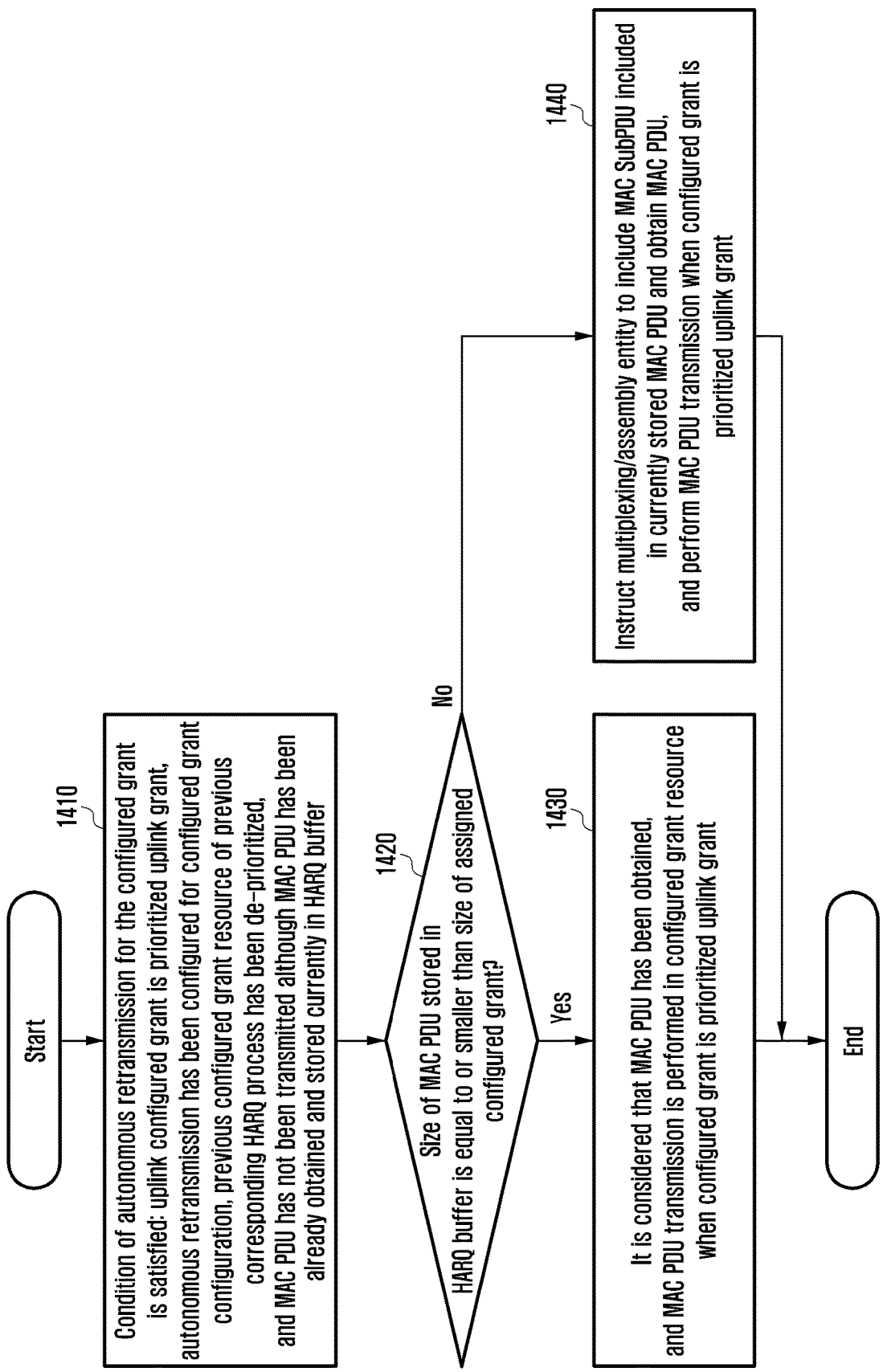
FIG. 14 illustrates an operation of a terminal considering (re)activation or (re)configuration of a resource when autonomous retransmission is performed according to an embodiment of the disclosure.

FIG. 14 illustrates an operation of a terminal considering (re)activation or (re)configuration of a resource when autonomous retransmission is performed according to an embodiment of the disclosure. When a configured grant resource has been configured, a base station may partially change the configuration of the configured grant due to a change in the channel state of the terminal, a change in the amount of data processed by the base station, or various other reasons. This configuration change may be configured through an RRC reconfiguration message (or a higher layer signaling), or in the case of a Type 2 configured grant, the configuration thereof may be reconfigured by an activation instruction through DCI of a physical downlink control channel (PDCCH) channel (or L1 signaling). Here, reconfigurable information may include the size of a MAC PDU (transport block) of the configured grant, information on a modulation and coding scheme (MCS), and the like.

As such, when the configured resource is reconfigured through the RRC reconfiguration message or activation or reactivation of the Type 2 configured grant, the configured CG needs to be a resource capable of transmitting a MAC PDU, which has been obtained and stored in the HARQ buffer, in order to perform autonomous retransmission.

Referring to FIG. 14, a condition in which autonomous retransmission for the configured grant in a MAC device (or entity) is satisfied is assumed in operation 1410. This may denote a case in which an uplink configured grant is a prioritized uplink grant, autonomous retransmission has been configured for the configured grant configuration, the previous configured grant resource of the previous corresponding HARQ process has been de-prioritized, and the MAC PDU has not been transmitted although the MAC PDU has been already obtained and stored currently in the HARQ buffer. However, in an embodiment, the case satisfying autonomous retransmission for the configured grant may denote the case where the uplink grant is a configured grant for which autonomous retransmission is configured, the previous configured grant resource of the previous corresponding HARQ process has been de-prioritized, and the MAC PDU has not been transmitted although the MAC PDU has been already obtained and stored currently in the HARQ buffer.

Here, it is possible to identify whether the size of the MAC PDU having been stored in the HARQ buffer is equal to or smaller than the size of the assigned configured grant in operation 1420. The identification is an operation of identifying a condition relating to whether the stored MAC PDU is transmittable to the corresponding configured grant. If operation 1420 is satisfied, this may denote that the configuration of the configured grant has not changed, or that the size of the MAC PDU of the configured grant has been changed to be larger than that of the MAC PDU in the previous configuration. Therefore, the MAC PDU can be transmitted in the configured grant as it is. If the size of the MAC PDU that is transmittable in the configured grant is larger than the size of the stored MAC PDU, padding may be included in resources that remain after inclusion of the stored MAC PDU. In some embodiments, in operation 1420, identifying whether the size of the MAC PDU having been stored in the HARQ buffer matches the size of the assigned configured grant may be the same as identifying whether the size of the MAC PDU having been stored in the HARQ buffer is equal to or smaller than the size of the assigned configured grant.

If the size of the MAC PDU having been stored in the HARQ buffer is smaller than or equal to the size of the assigned configured grant, it is considered that the MAC PDU has been obtained, and MAC PDU transmission can be performed when the configured grant is a prioritized uplink grant in operation 1430. Here, performing of the transmission of the MAC PDU may denote that new transmission is triggered for the HARQ process. Due to operation 1430, autonomous retransmission can be performed.

Otherwise, if the size of the MAC PDU having been stored in the HARQ buffer is larger than the size of the assigned configured grant, the terminal may instruct the multiplexing/assembly device (or entity) to include the MAC SubPDU included in the currently stored MAC PDU and acquire the MAC PDU, and may transmit the MAC PDU when the configured grant is a prioritized uplink grant in operation 1440. This may denote that new transmission of the newly obtained MAC PDU is triggered, since the MAC PDU is obtained, instead of performing autonomous retransmission, thereby producing the same effect as when a part of the MAC PDU having been stored for autonomous retransmission is autonomously retransmitted.

Figure 15:
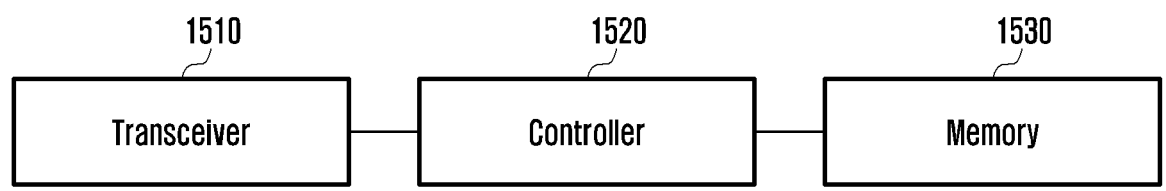
FIG. 15 illustrates a structure of a terminal according to an embodiment of the disclosure.

FIG. 15 illustrates a structure of a terminal according to an embodiment of the disclosure.

Referring to FIG. 15, the terminal may include a transceiver 1510, a controller 1520, and a memory 1530. In the disclosure, the controller may be defined as a circuit, an application-specific integrated circuit, or at least one processor.

The transceiver 1510 may transmit or receive a signal to or from another network entity. The transceiver 1510 may receive system information from a base station for example, and may receive a synchronization signal or a reference signal.

The controller 1520 may control the overall operation of the terminal according to an embodiment proposed in the disclosure. For example, the controller 1520 may control a signal flow between respective blocks to perform operations according to a flowchart described above.

The memory 1530 may store at least one of information transmitted and received through the transceiver 1510 and information generated through the controller 1520.

Figure 16:
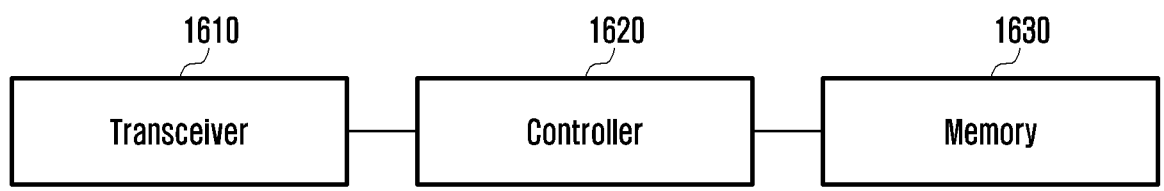
FIG. 16 illustrates a structure of a base station according to an embodiment of the disclosure.

FIG. 16 illustrates a structure of a base station according to an embodiment of the disclosure.

Referring to FIG. 16, the base station may include a transceiver 1610, a controller 1620, and a memory 1630. In the disclosure, the controller 1620 may be defined as a circuit, an application-specific integrated circuit, or at least one processor.

The transceiver 1610 may transmit or receive a signal to or from another network entity. The transceiver 1610 may transmit system information to a terminal for example, and may transmit a synchronization signal or a reference signal.

The controller 1620 may control the overall operation of the base station according to an embodiment proposed in the disclosure. For example, the controller 1620 may control a signal flow between respective blocks to perform operations according to the flowchart described above.

The memory 1630 may store at least one of information transmitted and received through the transceiver 1610 and information generated through the controller 1620.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a communication system, the method comprising:
   receiving, from a base station, configuration information on a configured grant for uplink transmission, the configured grant being configured with an autonomous transmission;
   in case that a previous configured grant for a hybrid automatic repeat request (HARQ) process was not prioritized, a transmission of a first medium access control (MAC) protocol data unit (PDU) obtained for the HARQ process has not been performed, and a size of the first MAC PDU matches a size of the configured grant, identifying that the first MAC PDU has been obtained for the configured grant;
   in case that the configured grant is a prioritized uplink grant, delivering the obtained first MAC PDU based on the configured grant; and
   in case that the size of the first MAC PDU does not match the size of the configured grant and the configured grant is the prioritized uplink grant, obtaining a second MAC PDU to transmit from multiplexing and assembly entity, and delivering the obtained second MAC PDU.

2. The method of claim 1, wherein delivering the obtained first MAC PDU further comprises:
   instructing the HARQ process to trigger a new transmission.

3. The method of claim 1, wherein the first MAC PDU is stored in a HARQ buffer associated with the HARQ process.

4. The method of claim 1,
   wherein the configuration information is received via a radio resource control (RRC) signaling,
   wherein in case that the configured grant is of type 1, information on resources for the configured grant is configured via the RRC signaling, and
   wherein in case that the configured grant is of type 2, the information on the resources for the configured grant is provided via downlink control information (DCI) on physical downlink control channel (PDCCH).

5. The method of claim 1, wherein the configuration information includes at least one of periodicity information, HARQ process identifier (ID) offset, and a number of HARQ processes for the configured grant.

6. The method of claim 5,
   wherein the HARQ process is identified based on the HARQ process ID offset and the number of HARQ processes for the configured grant, and
   wherein a HARQ process associated with the configured grant is equal to the HARQ process associated with the previous configured grant.

7. The method of claim 1, wherein the size of the first MAC PDU matches the size of the configured grant in case that the size of the first MAC PDU is equal to the size of the configured grant.

8. The method of claim 1, wherein the size of the first MAC PDU matches the size of the configured grant in case that the size of the first MAC PDU is less than or equal to the size of the configured grant.

9. A terminal in a communication system, the terminal comprising:
   a transceiver; and
   a controller coupled with the transceiver and configured to:
      receive, from a base station, configuration information on a configured grant for uplink transmission, the configured grant being configured with an autonomous transmission, in case that a previous configured grant for a hybrid automatic repeat request (HARQ) process was not prioritized, a transmission of a first medium access control (MAC) protocol data unit (PDU) obtained for the HARQ process has not been performed, and a size of the first MAC PDU matches a size of the configured grant, identify that the first MAC PDU has been obtained for the configured grant, in case that the configured grant is a prioritized uplink grant, deliver the obtained first MAC PDU based on the configured grant, and in case that the size of the first MAC PDU does not match the size of the configured grant and the configured grant is the prioritized uplink grant, obtain a second MAC PDU to transmit from multiplexing and assembly entity and deliver the obtained second MAC PDU.

10. The terminal of claim 9, wherein the controller is further configured to instruct the HARQ process to trigger a new transmission.

11. The terminal of claim 9, wherein the first MAC PDU is stored in a HARQ buffer associated with the HARQ process.

12. The terminal of claim 9,
wherein the configuration information is received via a radio resource control (RRC) signaling, wherein in case that the configured grant is of type 1, information on resources for the configured grant is configured via the RRC signaling, and wherein in case that the configured grant is of type 2, the information on the resources for the configured grant is provided via downlink control information (DCI) on physical downlink control channel (PDCCH).

13. The terminal of claim 9, wherein the configuration information includes at least one of periodicity information, HARQ process identifier (ID) offset, and a number of HARQ processes for the configured grant.

14. The terminal of claim 13,
wherein the HARQ process is identified based on the HARQ process ID offset and the number of HARQ processes for the configured grant, and wherein a HARQ process associated with the configured grant is equal to the HARQ process associated with the previous configured grant.

15. The terminal of claim 9, wherein the size of the first MAC PDU matches the size of the configured grant in case that the size of the first MAC PDU is equal to the size of the configured grant.

16. The terminal of claim 9, wherein the size of the first MAC PDU matches the size of the configured grant in case that the size of the first MAC PDU is less than or equal to the size of the configured grant.

* * * * *